United States Patent [19]

Samatham

[11] Patent Number: 5,134,690
[45] Date of Patent: Jul. 28, 1992

[54] AUGUMENTED MULTIPROCESSOR NETWORKS

[76] Inventor: Maheswara R. Samatham, 2157 Ridge Ave., Apt. 3D, Evanston, Ill. 60201

[21] Appl. No.: 372,426

[22] Filed: Jun. 26, 1989

[51] Int. Cl.⁵ .............................................. G06F 13/00
[52] U.S. Cl. .............................. 395/200; 364/DIG. 2; 364/229.5; 364/228; 364/230.6
[58] Field of Search ... 364/200 MS File, 900 MS File

[56] References Cited

U.S. PATENT DOCUMENTS

| | | |
|---|---|---|
| 4,598,400 | 7/1986 | Hillis . |
| 4,729,095 | 3/1988 | Colley et al. ........................ 364/200 |
| 4,730,322 | 3/1988 | Pollara-Bozzola . |

OTHER PUBLICATIONS

Samatham et al., "The DeBruiju Multiprocessor Network: A Versatile Parallel Processing and Sorting Network for VLSI", IEEE Trans. on computers, vol. 38, No. 4, Apr. 1989, pp. 567-581.
J. P. Hayes, et al., "A Microprocessor Based Hypercube Supercomputer,"IEEE Micro, pp. 6-17, Oct. 1986.
Samatham. et al., "The De Bruijn Multiprocessor Network: A Versastile Sorting Network", Proceedings of the 12th Annual International Symposium on Computer Architecture, 1985, pp. 360-367.
Samatham, et al., "A Multiprocessor Network Suitable for Single-Chip VLSI Implementation,"Proceedings of the 11th Annual International Symposium on Computer Architecture, 1984, pp. 328-337.
Samatham, M. R. "De Bruijn Multiprocessor Networks", Ph.D. Thesis for University of Massachusetts, 1986.

Primary Examiner—Thomas M. Heckler
Attorney, Agent, or Firm—Welsh & Katx, Ltd.

[57] ABSTRACT

An augmented De Bruijn multiprocessor network. Multiple microprocessors having a constant number of I/O ports are connected according to a network technique which yields a machine of predetermined degree. A modified binary De Bruijn graph of degree four, DG(2,k), is used as the basis for the preferred implementation. An augmentation technique supplements the basic De Bruijn topology with a 2D-mesh in a first set of steps and with a 3D-mesh in a second set of steps. The resulting machine topology contains substantially all of the problem-solving techniques important in multiprocessing, while maintaining a machine of constant degree.

22 Claims, 9 Drawing Sheets

| NODE | De BRUIJN NETWORK NEIGHBORS | | | | 2-D MESH NEIGHBORS | | 3-D MESH NEIGHBORS | |
|---|---|---|---|---|---|---|---|---|
| $i$ | SEA($i$) | SEAC($i$) | SEA$^{-1}$($i$) | SEAC$^{-1}$($i$) | | | | |
| 0000 | TO I/O | 0001 | TO 1111 | 1000 | 0011 | 0100 | 0010 | 1010 |
| 0001 | 0010 | 0011 | 1000 | 0000 | 1001 | 1110 | 0100 | 0101 |
| 0010 | 0100 | 0101 | 0001 | 1001 | 1100 | 0111 | 0000 | 0110 |
| 0011 | 0110 | 0111 | 1001 | 0001 | 0000 | 1000 | 1100 | 0111 |
| 0100 | 1000 | 1001 | 0010 | 1010 | 0000 | 1011 | 0001 | 1101 |
| 0101 | 1010 | 1011 | 1010 | 0010 | 1000 | 0110 | 1101 | 0001 |
| 0110 | 1100 | 1101 | 0011 | 1011 | 1111 | 0101 | 0010 | 1010 |
| 0111 | 1110 | 1111 | 1011 | 0011 | 1010 | 0010 | 1111 | 0011 |
| 1000 | 0001 | 0000 | 0100 | 1100 | 0101 | 0011 | 1001 | 1110 |
| 1001 | 0011 | 0010 | 1100 | 0100 | 0001 | 1101 | 1000 | 1011 |
| 1010 | 0101 | 0100 | 0101 | 1101 | 1100 | 0111 | 0110 | 0000 |
| 1011 | 0111 | 0110 | 1101 | 0101 | 0100 | 1111 | 1110 | 1001 |
| 1100 | 1001 | 1000 | 0110 | 1110 | 0010 | 1010 | 0011 | 1111 |
| 1101 | 1011 | 1010 | 1110 | 0110 | 1001 | 1110 | 0100 | 0101 |
| 1110 | 1101 | 1100 | 0111 | 1111 | 1101 | 0001 | 1000 | 1011 |
| 1111 | TO I/O | 1110 | TO 0000 | 0111 | 0110 | 1011 | 1100 | 0111 |

| CLASS OF PROBLEMS | EXAMPLES | COMMUNICATION TOPOLOGY |
|---|---|---|
| FINITE DIFFERENCE EQUATIONS FINITE ELEMENT EQUATIONS PARTIAL DIFFERENTIAL EQUATIONS | GEOPHYSICS AERODYNAMICS | 3D MESH |
| STATISTICAL LATTICE GAUGE | MELTING COULOMB GAS | 3D MESH RING 4D MESH (3D MESH AND TIME) |
| TIME EVOLUTION OF 1/r POTENTIAL | N-BODY GRAVITY | RING |
| TIME EVOLUTION OF GENERAL DYNAMICS | PARTICLE MOTION | 3D MESH |
| FAST FOURIER TRANSFORM | EVOLUTION OF UNIVERSE FLUID DYNAMICS | FFT GRAPH |
| ASCEND AND DESCEND | FFT, BITONIC SORT | SHUFFLE-EXCHANGE |
| NETWORK SIMULATION | CIRCUIT SIMULATION NEURAL NETWORK | LOGARITHMIC GRAPH LOGARITHMIC GRAPH |
| ISOLATED | RAY TRACING, DATA ANALYSIS INITIAL CONDITION STUDY | ISOLATED PROCESSORS |
| IMAGE PROCESSING | ANALYSIS OF SATELLITE DATA | LOGARITHMIC GRAPH, 2D MESH, 2D TORUS, 3D MESH |
| ARTIFICIAL INTELLIGENCE | CHESS | TREE |
| DECOMPOSABLE SEARCHING CLASS | SEARCHING | TREE MACHINE |
| EVENT-DRIVEN SIMULATION | INDUSTRIAL ECONOMIC, MILITARY | LOGARITHMIC GRAPH |
| PIPELINE CLASS | MATRIX-VECTOR MULTIPLICATION | LINEAR ARRAY |
| NP-COMPLETE | FINDING A HAMILTONIAN PATH IN A GRAPH | TREE |
| MULTIPLEX | POLYNOMIAL EVALUATION | TREE |

FIG. 12

|  | ABDM | HYPERCUBE |
|---|---|---|
| DIAMETER | $Log_2 N$ | $Log_2 N$ |
| DEGREE | 8 TO 12 | $Log_2 N$ |
|  | $c_1, c_2, c_3$ = CONSTANTS | |
| LINEAR ARRAY OF SIZE $\ell$ ($1 \leq \ell \leq N$) | $c_1 \times \ell$ | $c_1 \times \ell$ |
| 2D-MESH OF SIZE (j×k) $1 \leq j \leq N/k$ $1 \leq k \leq N/j$ | $c_2 \times j \times k$ | $c_2 \times j \times k$ |
| 3D-MESH OF SIZE (i×j×k) $1 \leq i \leq \sqrt[3]{N}$ $1 \leq j \leq \sqrt[3]{N}$ $1 \leq k \leq \sqrt[3]{N}$ | $c_3 \times i \times j \times k$ | $c_3 \times i \times j \times k$ |
| FFT | $Log_2 N$ | $Log_2 N$ |
| TREE | $Log_2 N$ | $> Log_2 N$ |
| DECOMPOSABLE SEARCHING CLASS | $Log_2 N$ | $> 2 Log_2 N$ |

AUGUMENTED MULTIPROCESSOR NETWORKS

FIELD OF THE INVENTION

The invention pertains generally to multiprocessor networks and methods for connecting them, and is more particularly directed to multiprocessor networks which utilize a modified De Bruijn graph with augmentation as a technique to implement the connections of the network.

BACKGROUND OF THE INVENTION

Computer systems are becoming larger and faster every day. Where just a few years ago machines which would execute a million instructions per second (MIPS) were on the leading edge of technology, even desktop machines today are measured in multiples of this execution benchmark. Supercomputers are hundreds of times faster than this and have complex architectures and specialized hardware to attain this speed.

In conventional machines of the Von Neumann architecture where instructions are executed in a sequence, faster circuitry and clock speeds, and specialized memory architectures are used to speed program throughput. In these machines, cache memories are used in favor of slower memories, and increased parallel handling of longer instructions on faster buses is performed.

Another approach is parallel processing including pipeline processing where the execution of an instruction is broken into several tasks. While one task is performed on one instruction, other tasks in the pipeline can be performed on the instructions which precede it and which follow it, thereby essentially executing several instructions at once. The concept of pipelining can be taken a step further by separating the execution of a program into parcels which can be executed by separate hardware in one machine. This type of parallel processing requires coordination between both the hardware and the operating system software to assign tasks and to communicate the results between the parallel parts.

An even more sophisticated parallel processing engine can be developed where the operating system not only parses across different portions of the hardware in one machine but also parses across several different processors (multiprocessing), which can in and of themselves be of a highly complex architecture. However, when an operating system parses a program for execution across multiple machines, the architecture and method of connecting the machines in the communications network is extremely important to the success of the overall system. The instruction execution speed gained in parallel execution can be lost in inefficient parsing and communication between machines. Even the most efficient communication and connection schemes increase overhead execution time with increasing complexity.

Thus, supercomputers built with multiprocessing engines can become extremely expensive very quickly. However, the most straightforward and least expensive way to build a supercomputer capable of hundreds or thousands of MIPS is to interconnect a large number of very fast microprocessors. These single chip computers are becoming extremely fast and flexible for their size and cost, and generally contain their own memory, communications ports, timing and bus structures. Many are even equipped with executive instructions and modes of operation which are specifically designed for multiprocessing and networking. Such individual components which incorporate this degree of power and communication ability are ideally suited for interconnection into a supercomputer, but the problem remains as to which network connection scheme will be most efficient for maintaining overall control of program execution and communications.

The easiest network connection scheme for connecting N processors is to connect every processor to every other processor by a communication link. This technique has its drawbacks because, for every processor that is added, an extra communications port and link must be added to every other processor previously in the system. In addition, system overhead for maintaining and controlling communication links between all machines becomes exorbitant. It has been found that architectures which connect less connections than all processors to every other processor are still advantageous in parallel processing applications. What has evolved in the parallel processing context can be characterized as a series of problems or general program algorithms which must be solved efficiently by the parallel processing engine. If an architecture can solve the majority of these problems, then it has the necessary power to be a generalized parallel processing architecture.

An architecture which has had some success with such problems is one termed the hypercube. An n-dimensional hypercube computer, also known as a binary n-cube computer, is a multiprocessor engine characterized by the presence of $N=2^n$ processors interconnected as an n-dimensional binary cube. Each processor forms a node, or vertex, of the cube and has its own CPU and local memory. Any processor has direct communication paths to n other processors. These connected processors are its neighbors, and the communication links correspond to the edges of the cubes. There are $2^n$ distinct n-bit binary addresses or labels that may be assigned to the processors. Thus, each processor address differs from that of each of its n neighbors by exactly one bit position.

It is known that the hypercube structure has a number of features that make it useful for parallel computation. For example, meshes of all dimensions and trees can be embedded in a hypercube so that neighboring nodes are mapped to neighbors in the hypercube. The communication structure used for the fast Fourier transform (FFT) and sorting algorithm can also be embedded in the hypercube. Since a great many scientific applications use the mesh, tree, FFT, or sorting interconnection structures, the hypercube is a good general-purpose parallel architecture. Even for problems with less regular communication patterns, the internode distance (graph diameter) of the hypercube of $n=\log_2 N$ means that any two nodes can communicate fairly rapidly. This diameter is larger than the unit diameter of a complete graph $K_n$, but is achieved with nodes having only a degree n, or a fanout of $\log_2 N$, as opposed to the $N-1$ degree of nodes in $K_n$.

Other standard architectures with a small degree, such as meshes, trees, or bus systems, have either a large diameter ($\sqrt{N}$ for a two-dimensional mesh) or a resource that becomes a bottleneck in many applications because too much of the total communications must pass through it (such as occurs at the apex of a tree or a shared bus network). Thus, from a general topological viewpoint, the hypercube architecture balances node connectivity, communication diameter, algorithm embedability, and programming ease. This balance makes the hypercube suitable for a broad class of computational problems. See Hayes, et al., "A Microprocessor-based Hypercube Supercomputer", *IEEE Micro*, pp. 6–17, Oct., 1986.

A major drawback of the hypercube, however, is that it has a degree $\log_2 N$, where N is the total number of nodes, which grows with the size of the network. This causes the design of the node processors to change with the size of the network because the number of ports needed to connect to other processors varies. Also, the complexity of each processor increases with the size of the network because of the non-constant degree of the network. Presently, the $\log_2 N$ degree of the hypercube has not proven to be an impediment because of the relatively low number of processors, e.g., $N < 2^{10}$, used in current machines. However, in the future, when a concurrent processor (supercomputer) with a massive number of processors is needed, the degree of $\log_2 N$ may prove to be a critical and limiting factor. Therefore, there is a need for a high performance concurrent computer with easy node connectivity, similar to the hypercube, but with a constant degree. It is evident that it would be highly advantageous to be able to configure such a constant degree network supercomputer in substantially all the standard communications topologies used in solving multiprocessor problems.

SUMMARY OF THE INVENTION

Improved multiprocessor networks are provided by the invention. N microprocessors having a constant number of I/0 ports are connected according to the invention to form a multiprocessor interconnection topology containing most of the standard problem solving techniques in multiprocessing. The N microprocessors are first connected as undirected binary De Bruijn multiprocessor network of diameter k where $N = 2^k$. The De Bruijn network is then initially augmented with a two-dimensional (2D) mesh according to the method of the invention. A subsequent step according to the method of the invention augments the 2D-mesh with a three-dimensional (3D) mesh.

According to the invention, the resultant augmented De Bruijn multiprocessor network has the advantage of being of constant degree such that expansion of the network can be planned with a single microprocessor architecture. For example, a redesign of the network to double its capacity would require adding microprocessors of the same design and a rewiring of the network. Such expansion with other networks of variable degree, such as the hypercube, require a much more complex design strategy including the redesign of each node.

In the preferred embodiment, the invention teaches a method for augmenting a modified binary De Bruijn network formed from a De Bruijn graph and having 16 processors. Initially, the network is connected as a modified De Bruijn network because of the large number of problem solving topologies which are contained therein and because of the constant degree of such graph. A Hamiltonian path is then calculated through the graph such that the links in the path form a linear array. Subsequent to finding the Hamiltonian path, the linear array is arranged in a matrix format of rows and columns with the path connecting all nodes in a row together and connecting the rows together at their ends.

An augmentation technique is used to produce a 2D-mesh from this array by providing two extra communication links per node. The links are connected by adding links between row nodes which are not already connected, adding links between the nodes on the ends of rows, and adding links between the nodes at the top and bottom of the columns. These additional links thereby produce a machine of degree 6 which embeds a 2D-mesh, and further retains all of the benefits and topologies of the De Bruijn machine of degree 4.

A second augmentation technique is then used to produce a 3D-mesh from the foregoing machine by providing two extra communication links per node. Initially, the 2D-mesh machine is segmented into l smaller arrays of size p×q, where $l \times p \times q = 2^k$. These l smaller arrays are stacked in a sequence 1,2, ... l where nodes in one array have previous and subsequent corresponding neighbors in the stack of arrays. Each end of the array is defined as the previous or subsequent array to the other end, depending upon the direction of travel through the stack. The 3D-mesh topology is then implemented by connecting each node to a corresponding previous node and a corresponding subsequent node of the array stack. These additional links thereby produce a machine of degree 8 which embeds a 3D-mesh, a 2D-mesh, and further retains all of the benefits and topologies of the De Bruijn machine of degree 4.

BRIEF DESCRIPTION OF THE DRAWINGS

These and other objects, features and aspects of the invention will be better understood and more fully described upon reading the following detailed description in conjunction with the appended drawings wherein.

DETAILED DESCRIPTION OF THE PREFERRED EMBODIMENT

Some definitional terms for multiprocessor networks will now be provided, which terms will be later used in the explanation of the invention. A multiprocessor "graph" is a widely used model for a multiprocessor network, wherein the "nodes" of the graph are the processors and the "edges" are the existing communication links between the processors. In defining a multiprocessor graph, the "length" of the path between two nodes is the number of edges encountered in the path. A "Hamiltonian" path (linear array) is defined as a path passing through all nodes of the graph exactly once. The "distance" between two nodes is the length of the shortest path between these two nodes. The "diameter" of the network is the largest distance between any two nodes. The "degree" of a node is the number of edges connected to that node. The "degree of a network" is the largest degree of any of the nodes in that network.

A preferred implementation of the invention augments a modified undirected De Bruijn multiprocessor graph. The undirected De Bruijn graph $DG(d,k)$ of $N=d^k$ nodes has a diameter k and degree 2d; it corresponds to the state-graph of a shift register of length k using d-ary digits. A shift register changes a state by shifting in a digit of the state number on one side, and then shifting out one digit from the other side. If we represent a node by $d_{k-1}d_{k-2}...d_1d_0$, where $d_j \epsilon \{0,1,...,(d-1)\}$, $0 \leq j \leq (k-1)$, then its neighbors are represented by $d_{k-j}d_{k-3}....d_0 p$ and $pd_{k-1}d_{k-2}...d_2d_1$, where $p = 1,2,...,(d-1)$.

A multiprocessor network based on the undirected De Bruijn graph, $DG(2,k)$, is called an undirected binary Bruijn Multiprocessor network denoted by BDM(k) network. The $DG(2,k)$ for any integer k, can be obtained as follows. If a node, i, is represented by a k-bit binary number, say, $i=a_{k-1}a_{k-2}......a_1a_0$, then its neighbors can be represented as:

$$a_{k-2}a_{k-3}......a_1a_0a_{k-1} \quad (i_1)$$

$$a_0a_{k-1}........a_2a_1 \quad (i_2)$$

$$a_{k-2}a_{k-3}......a_1a_0\bar{a}_{k-1} \quad (i_3)$$

$$\bar{a}_0a_{k-1}........a_2a_1 \quad (i_4)$$

Neighbor $i_1$ is obtained by a Shift End Around (SEA) operation on i; hence, $i_1$ and i are called SEA neighbors. The neighbor $i_3$ is obtained by Shift End Around Complement (SEAC) operation on i; hence, $i_3$ and i are called SEAC neighbors. In particular, the above four neighbors of i are deviated as SEA(i), $SEA^{-1}(i)$, SEAC(i) and $SEAC^{-1}(i)$, respectively. Note that SEA $(SEA^{-1}(i)) = i$, and SEAC $(SEA^{-1}(i)) = i$. An edge $<i,j>$ is called the SEA edge if $j = SEA(i)$ or $j = SEA^{-1}(i)$. Similarly, an edge $<i,j>$ is called the SEAC edge if $j = SEAC(i)$ or $j = SEAC^{-1}(i)$.

In the BDM network, one can reach from any source node $a_{k-1}a_{k-2}...a_1a_0$ to any destination node $b_{k-1}b_{k-2}...b_1b_0$ in $\log_2 N (=k)$ hops as shown below:

$a_{k-1}a_{k-2}.....a_1a_0$ $a_{k-2}a_{k-3}.....a_0b_{k-1}$ $a_{k-3}a_{k-4}.....b_{k-1}b_{k-2}$ $a_0b_{k-1}......b_2b_1$ $b_{k-1}b_{k-2}.....b_2b_0$

Therefore, the diameter k of the BDM is exactly $\log_2 N$. However, the degree of the BDM is constant at 4, which is independent of N.

One of the attractive features of this multiprocessor network is that it allows for simple routing. Each message carries certain tag bits, in addition to the usual source and destination addresses. These tag bits are generated at the source and go through certain minor modifications at each intermediate node. Thus, message routing can be done with local information without any global information. In a preferred implementation, the BDM network is augmented with additional communication links according to the method of the invention to form an Augmented Binary De Bruijn Multiprocessor network (ABDM).

Figure 1:
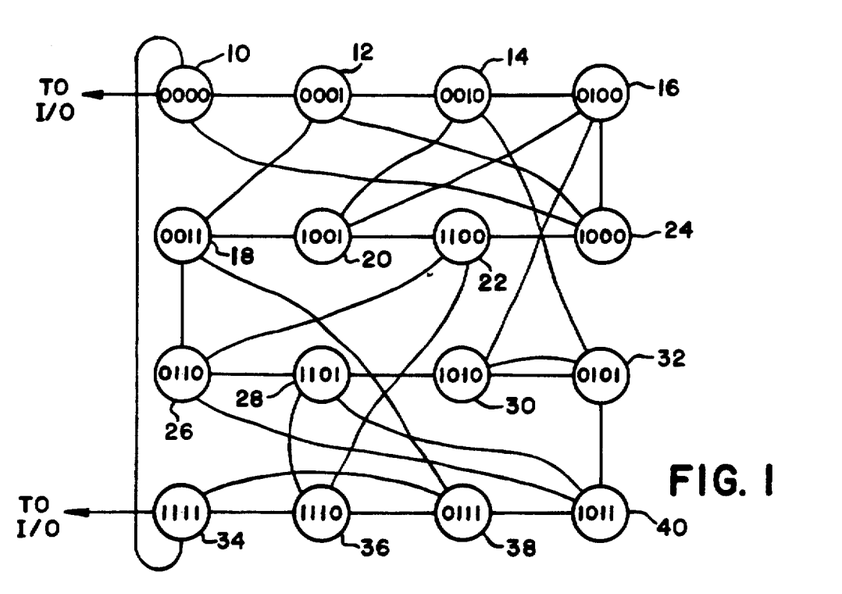
FIG. 1 is a pictorial representation of a multiprocessor network based on a modified undirected binary De Bruijn graph of degree 4, having $2^4$ nodes.

A multiprocessor network having the topology of $DG(2,k)$ is shown in FIG. 1. The illustrated embodiment is based on a $DG(2,4)$ with $2^4$ or 16 microprocessor nodes 10-40. Each node represents a multiported microprocessor which is connected to four other microprocessors, i.e., the degree is also 4. The BDM has been modified to provide a communications link between nodes 10 and 34 and to use one port of these nodes as a I/0 node for the system. The I/0 ports of the nodes 10 and 34 are used to communicate with peripheral devices of the input-output type, i.e., displays, keyboards, disks, etc. The Augmented Binary De Bruijn Multiprocessor Network (ABDM) is obtained from the modified De Bruijn multiprocessor network shown here by a series of augmentation steps. During the first augmentation steps, the BDM is augmented with a 2D-mesh (torus). In the second group of steps, a 3D-mesh (torus) is obtained by adding communication links to the network obtained in the first group of steps.

Figure 2:
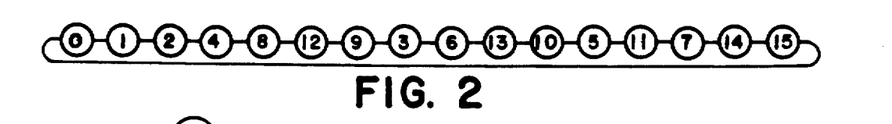
FIGS. 2–6 are pictorial representations of the steps of a method according to the invention for augmenting the multiprocessor network illustrated in FIG. 1 with a 2D-mesh topology.

The augmentation needed to produce a 2D-mesh is illustrated in FIGS. 2-6. Initially, a Hamiltonian path (linear array) is obtained for the BDM. The linear array can be obtained in many ways, but preferably such is generated using the algorithm given in "The De Bruijn Multiprocessor Network," Ph.D. Thesis by M. R. Samatham, University of Massachusetts, (Feb. 1986). A linear ring array using this algorithm from the modified BDM illustrated in FIG. 1 is more fully set forth in FIG. 2. In FIG. 2, the other communication links of the BDM are not shown, and only the connecting links between each node forming the Hamiltonian path are drawn. The binary address of the node has also been replaced by its decimal equivalent.

Figure 3:
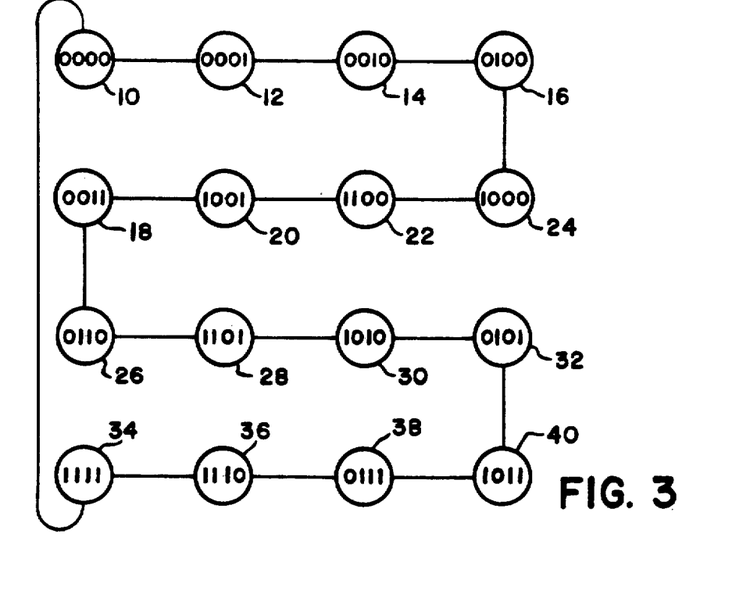
Figure 4:
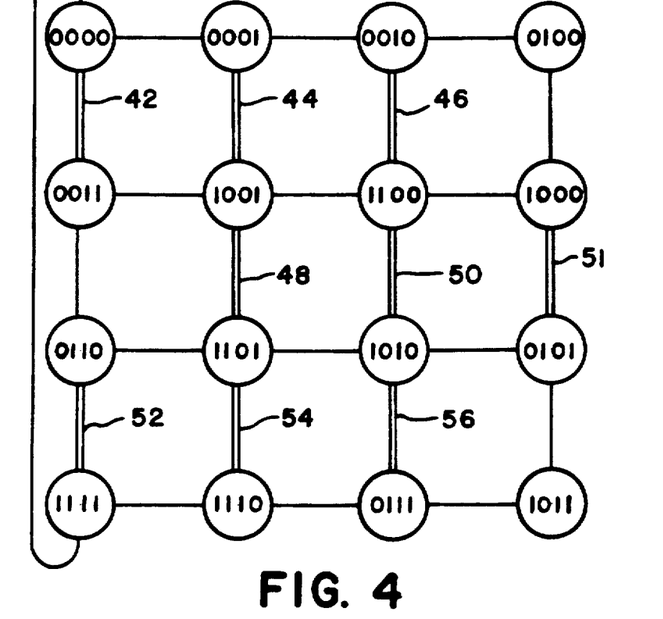
Figure 5:
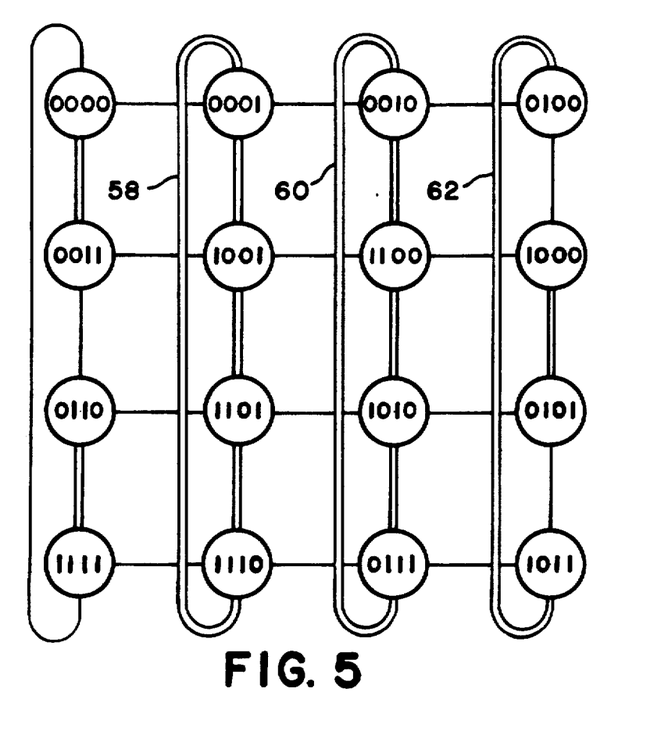
Figure 6:
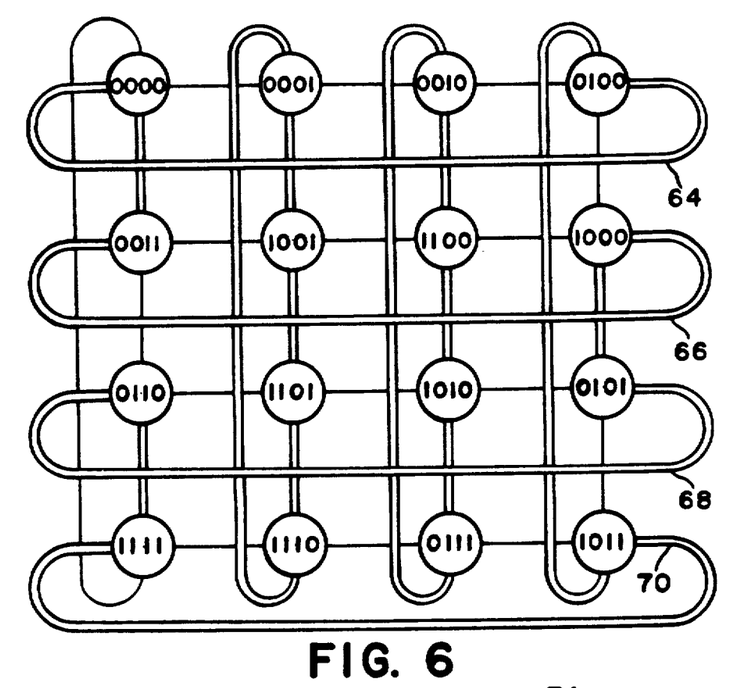

The linear array is then arranged in a matrix-like fashion, so that there are i rows and j columns of nodes as illustrated in FIG. 3. For the majority of practical purposes, $i=j=2^{k/2}$ if k is even, $i=2^{\lfloor k/2 \rfloor}$ and $j=2^{\lfloor k/2 \rfloor+1}$ if k is odd. But i and j can take any reasonable values such that $i \times j = 2^k$. Communication links 42-56 are added between nodes which are in adjacent rows and the same column if these links are not already existing (FIG. 4). Similarly, communication links 58, 60, 62 are added between nodes which are in the first row and last row but in the same column (FIG. 5). Finally, communication links 64-70 are added between nodes which are in the first column and last column but in the same row (FIG. 6). In other words, communications links are added to augment the modified BDM with a 2D-mesh having wrap-around connections. It can be seen that the resultant graph is of degree 6 and of a diameter $\log_2 N$. For signal processing applications, a hexagonal 2D-mesh and an octagonal 2D-mesh can be efficiently used. The hexagonal 2D-mesh and the octagonal 2D -mesh can be introduced by adding appropriate communications links to the 2D-mesh just obtained. Once a hexagonal 2D-mesh is obtained, a triangular 2D-mesh is inherently present in the network.

Figure 7:
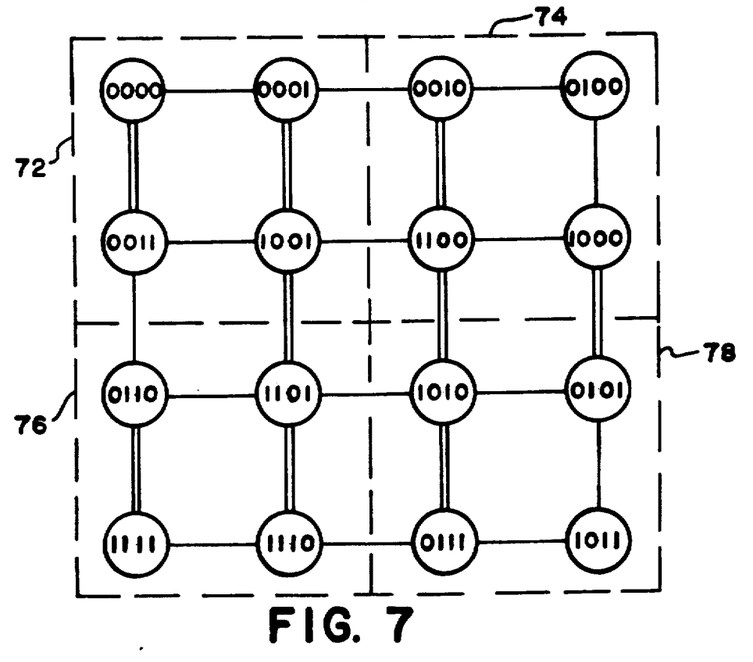
FIGS. 7–8 are pictorial representations of the steps of a method according to the invention for augmenting the 2D-mesh topology illustrated in FIG. 6 with a 3D-mesh topology.

A 3D-mesh can then be added to the machine by augmenting the machine of FIG. 6. First assume that the network obtained in FIG. 6 is cut into l small meshes 72, 74, 76, 78 of size p×q each (FIG. 7). For the majority of practical purposes, $p=q=l=2^{k/3}$ if 3 divides k; $p=2^{\lfloor k/3 \rfloor}, q=2^{\lfloor k/3+1 \rfloor}$ and $l=2^{\lfloor k/3+1 \rfloor}$ if 3 divides (k−2); $p=2^{\lfloor k/3 \rfloor}, q=2^{\lfloor k/3 \rfloor}$ and $l=2^{\lfloor k/3+1 \rfloor}$ if 3 divides (k−1). However, p, q, and l can take any reasonable values such that $p \times q \times l = 2^k$. Next these l small meshes 72-78 are assumed to be positioned in a sequential stack as in FIG. 8. Thereafter, two communication links 80-99 are added to each node, one to connect the node in the top (previous) mesh and the other to connect the node to the bottom (subsequent) mesh, to augment the topology with a 3D-mesh having wrap-around connections.

Figure 8:
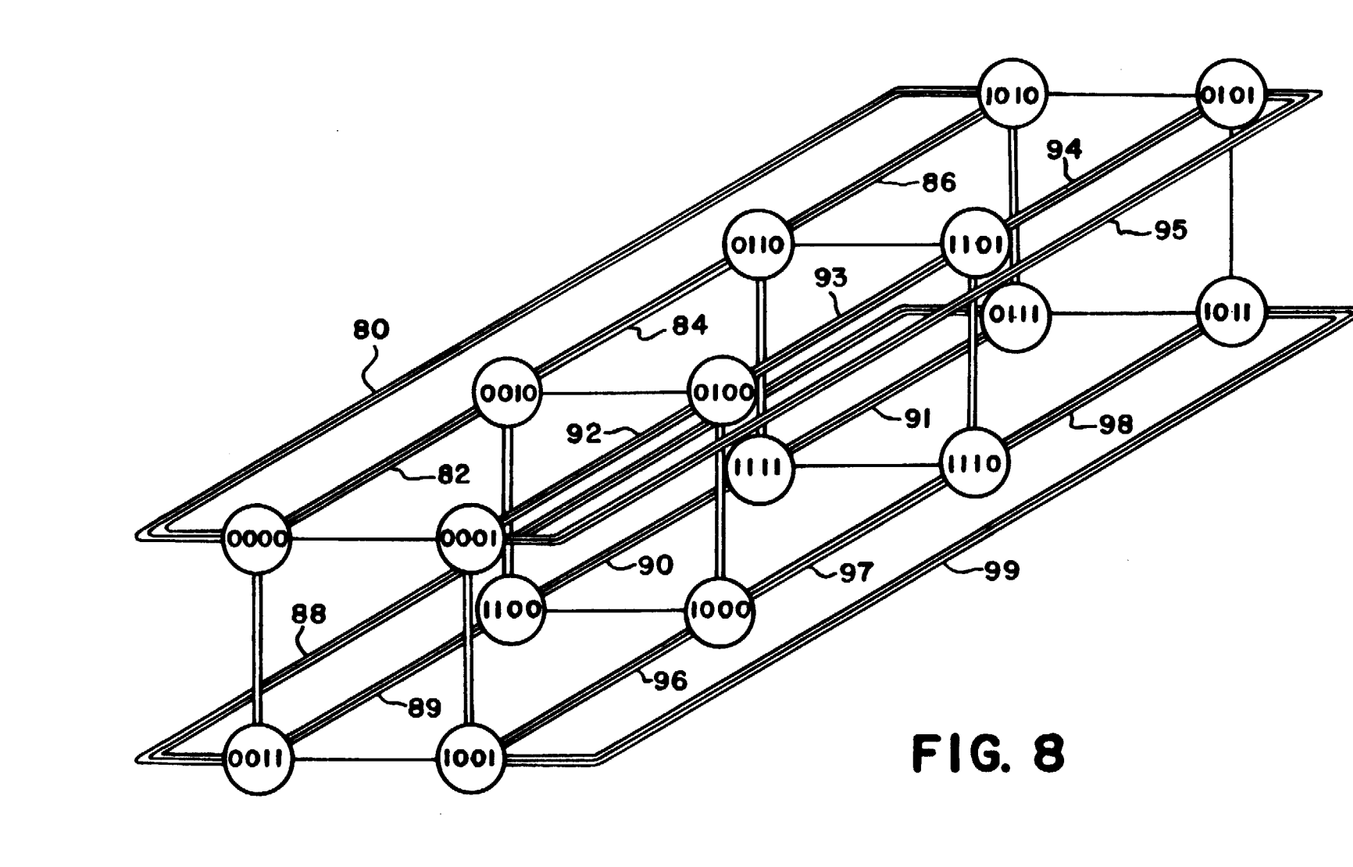
Figure 9:
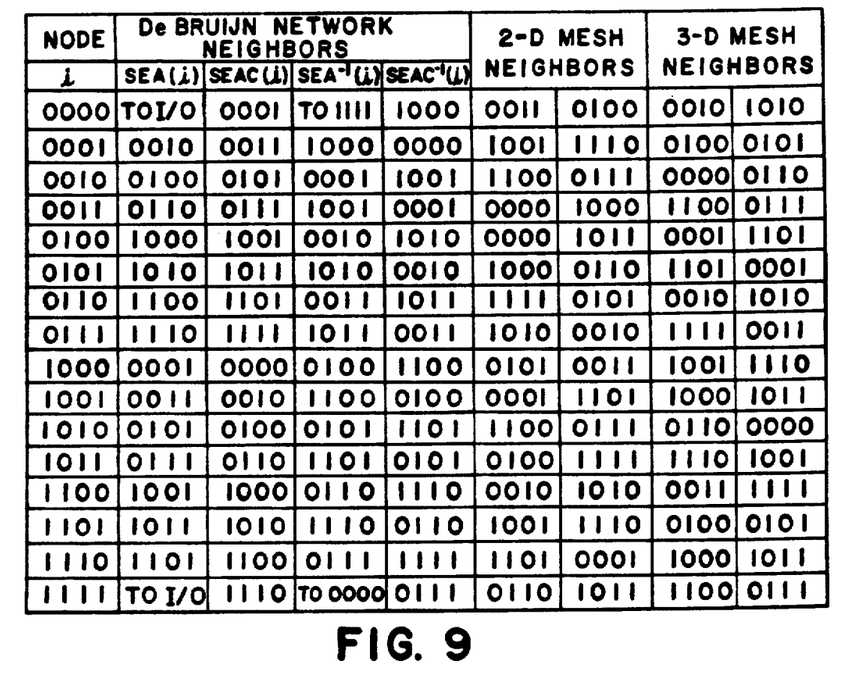
FIG. 9 is a tabular representation of a communication link connection table illustrating the connection of each processor N with all other processors for the multiprocessor network illustrated in FIG. 8.

The multiprocessor network based on the final augmentation, shown in FIG. 8 is the Augmented Binary De Bruijn Multiprocessor network (ABDM), which is of degree 8 and diameter $\log_2 N$. There are many possible ABDMs for a given size, and the follow aspects determine the possible ABDMs: (i) the algorithm used to obtain Hamiltonian path in the modified BDM; (ii) the augmentation method used to obtain 2D-mesh, and (iii) the augmentation method used to obtain 3D-mesh. If the hexagonal mesh and/or the octagonal mesh are introduced in the 2D-mesh, then the 3D-mesh will also have the hexagonal mesh and/or the octagonal mesh, respectively, in each of the small meshes. FIG. 9 illustrates the connection of each of the nodes to its neighbors for the modified BDM and the two augmentation steps.

Figure 10:
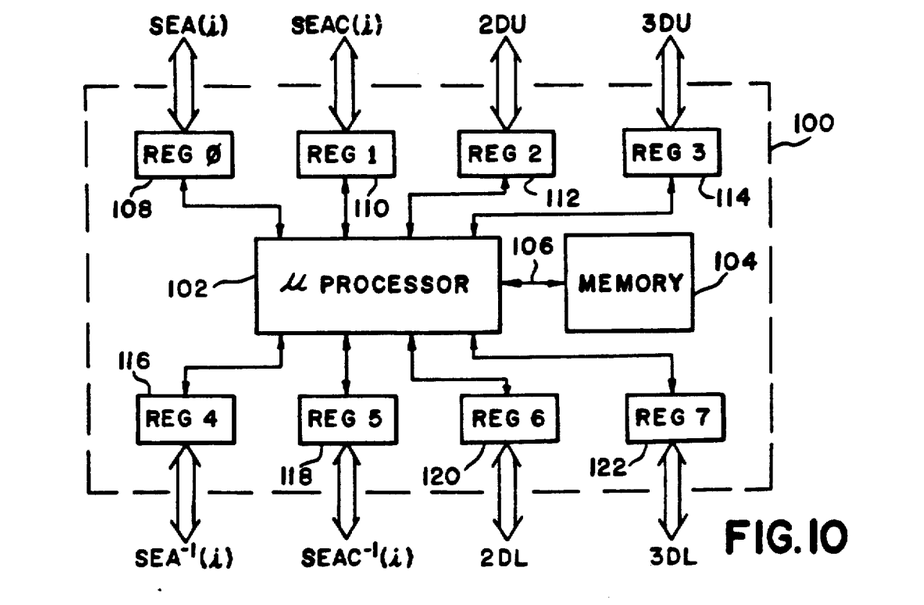
FIG. 10 is system block diagram of one of the regular nodes of the multiprocessor networks illustrated in FIGS. 1, 6 and 8.

In FIG. 10, one of the microprocessor network nodes 100 is shown which is relatively standard in structure such that the system can be configured or reconfigured with ease. Each node 100 contains a microprocessor 102 and localized memory 104 which communicate with each over standard control, data, and address busses 106. In addition, the microprocessor has a plurality of registers 108-122 which are representative of the nodes i which the node 100 is connected to. The present machine is of a constant degree 8 and therefore has registers REG0-REG7. This configuration allows a simple input output structure wherein eight I/O ports are used to communicate with the other nodes of the network.

Figure 11:
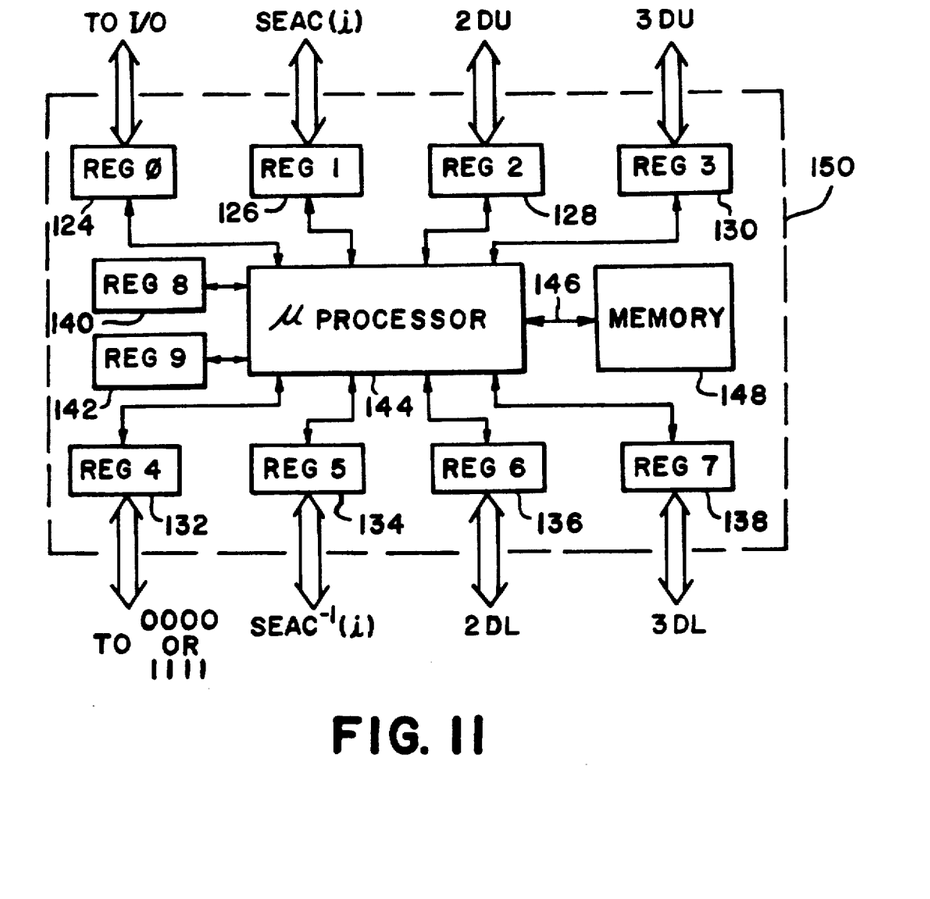
FIG. 11 is a system block diagram of the microprocessors which form input-output nodes of the multiprocessor network illustrated in FIG. 8.

In general, one of the registers, indicated as REG0 and labelled 108, is connected to the microprocessor node SEA (i), while another port, indicated as REG1 and labelled 110, is connected to its compliment node SEAC (i). The addresses of the inverted neighbors SEA$^{-1}$ (i) and SEAC$^{-1}$ (i) are connected through I/O ports assigned to REG4 and REG5, which are labelled 116 and 118, respectively. Another I/O port, represented as REG2 and labelled 112, is connected to the 2D mesh upper link node (2DU), while the still another I/O port, represented as REG6 and labelled 120, is connected to the node represented by the 2D-mesh lower link (2DL). The I/O port represented by REG3, labelled 114, is connected to the 3D-mesh upper plane (3DU), while the I/O port represented by REG7 and labelled 122 is connected to a link for the 3D-mesh lower plane (3DL). Each of the 16 nodes in the present implementation is configured identically with the node illustrated as 100. This regularity of the processors and constant degree of the network provides a facile structure for the augmented De Bruijn multiprocessor network. FIG. 11 illustrates the communication nodes 10 and 34 which have an external I/0 port 124, REG0. The microprocessor node 150, having elements 124-138, is in other respects similar to that explained in FIG. 10.

The software for the Augmented Binary De Bruijn multiprocessor network depends mainly on the type of microprocessor used. Similar to the hypercube architecture (see Charles L. Seitz, "The Cosmic Cube," *Communications of the ACM*, Vol. 28, No. 1, Jan. 1985, pp. 22-33), the lowest level of software is the machine intrinsic environment. This includes the instruction set of the node processor, its I/0 communication with its neighbors, and a small initialization and boot-strap loader program in the read-only storage of each microprocessor. The initialization also involves messages that check the function of all the communication channels to be used. Program loading following initialization typically loads a kernal program to each memory 104 of each microprocessor. The initial load is from an external I/0 port and then through the interconnection links to all nodes. The small operating system kernal, resident at each node, routes messages between processes and, hence, between any arbitrary pair of nodes. The kernal can spawn and kill processes, schedule their execution, monitor them, manage storage, and deal with error conditions. A host computer will have overall control.

The applications environment for the machine is characterized by programs written in a higher level language (Fortran or C) in which there is a single process per node and in which messages are sent by direct I/0 operations to a specified neighbor.

Figure 12:
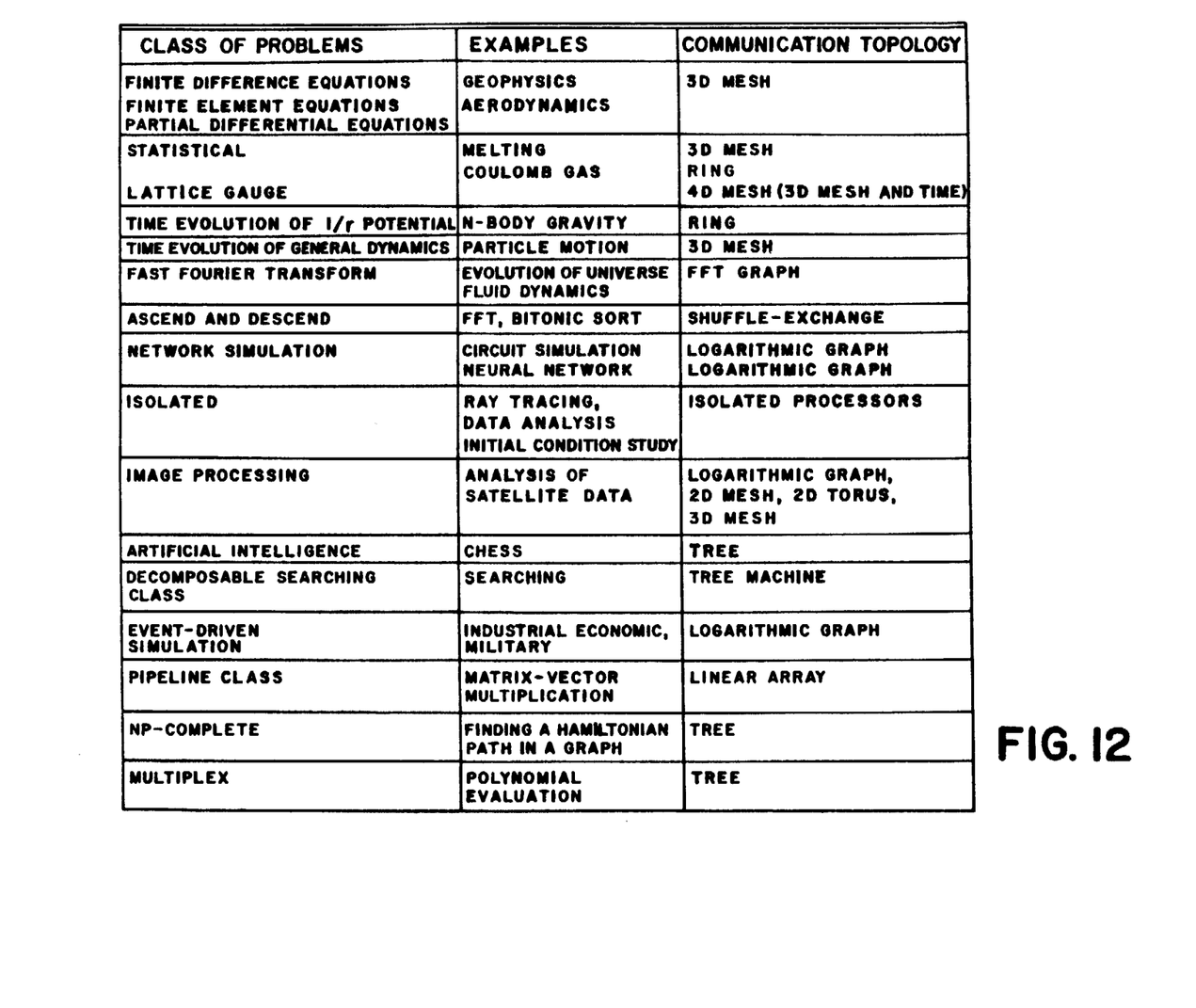
FIG. 12 is tabular representation of the various classes of problems which can be solved by the communications topologies contained within the multiprocessor network illustrated in FIG. 8.

Many engineering and scientific problems have been successfully grouped into various classes which are summarized in the table of FIG. 12. Included among these classifications are the pipeline class, the multiplex class, the NP-complete class, the ascend and descend classes, and the decomposable searching class. The problems in the pipeline class can be efficiently solved in a pipe (known also as a linear array). Depending on the problem, data may flow in one direction or in both directions simultaneously. Matrix-vector multiplication is a typical example of those problems which can be solved by one-way pipeline algorithms. Band matrix-vector multiplication, recurrence evaluation and priority queues are other representative examples of problems that can be solved by two-way pipeline algorithms.

The multiplex class covers a range of problems characterized by: (1) Operations on N data operands to produce a single result, and (2) Evaluations which can be described by a tree. This category includes evaluation of general arithmetic expressions, polynomial evaluation, etc. The natural computation graph for this paradigm is a tree, whose nodes correspond to operations, and whose edges correspond to dataflow between operations. The CBT (complete binary tree) can be used to solve the problems belonging to this class. The NP-complete class is another important class of problems. The CBT can efficiently implement exhaustive search algorithms for this class. Here the time complexity still is exponential.

The ascend and descend classes are comprised of highly parallel algorithms. The paradigm of the algorithms in this class is the iterative rendition of a divide-and-conquer scheme. The input and output are each vector of N ($=2^k$) data items; "divide" referring to two subproblems of equal size, the "marry step" combining the results of two subproblems which consist of execution of a single operation on corresponding pairs of data items. Assume that input data $D_0D_2...D_{N-1}$ are stored, respectively, in storage locations $T[0], T[1],...T[N-1]$. An algorithm in the descend class performs a sequence of basic operations on pairs of data that are successively $2^{k-1},...2^12^0$ locations apart. In terms of the above divide-and-conquer model, the marry step involves pairs of $2^0$ locations apart. In the dual class the ascend class), the basic operations are performed on the data that are successively $2^0,2^1,...,^{k-1}$ locations apart; the marry step involves pairs of $2^{k-1}$ locations apart. These problems can be solved in the shuffle-exchange and the cube-connected cycles.

The problems in the decomposable searching class can be described in a query structure. Preprocess a set F of N objects into a data structure D, such that certain kinds of queries about F can be answered quickly. A searching problem is decomposable if the response to a query Q, asking the relation of an object z to the set F, can be written as: $Q(z,F) = \Delta q(z,f)$, for all f in F, where f is an element in F, $\Delta$ is a binary operator which is associative, commutative and has an identity, and where q is the query asking the relation of the object z to the element f. A tree machine can be used to solve this large class of searching problems.

Figure 13:
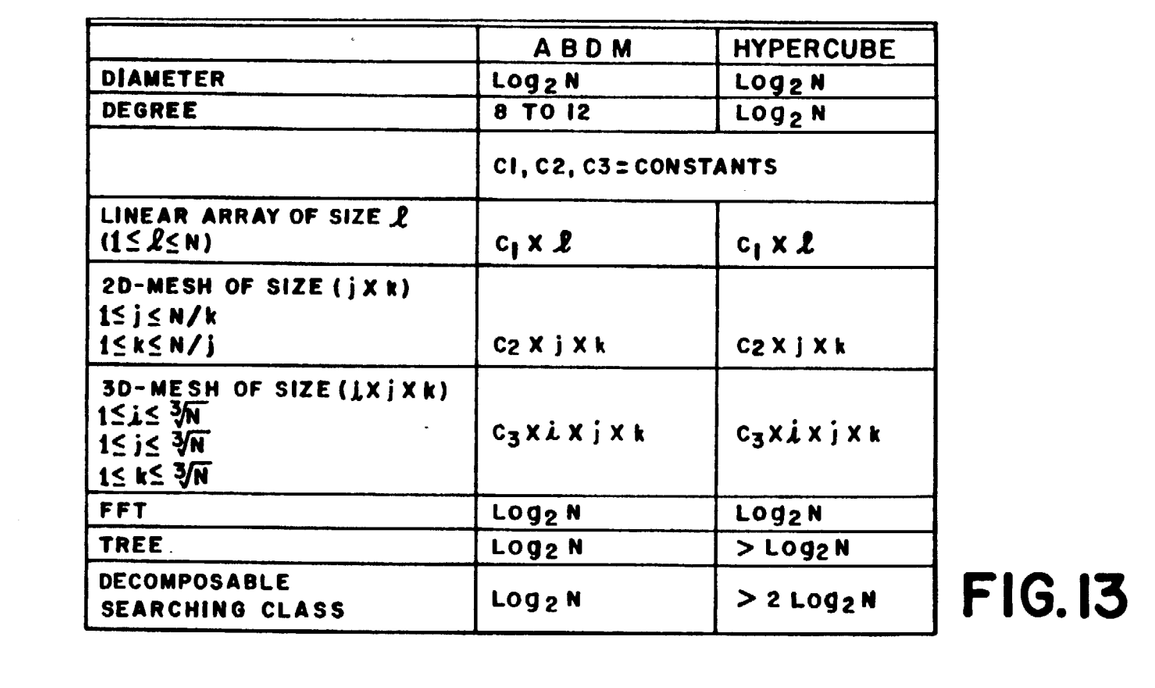
FIG. 13 is a tabular representation of the performance of the network topology illustrated in FIG. 8 compared with the network topology termed the hypercube.

FIG. 13 compares some of the network parameters of the ABDM with the hypercube. The advantages of a constant degree network without the loss of problem solving capability is readily evident from the comparison.

Figure 14:
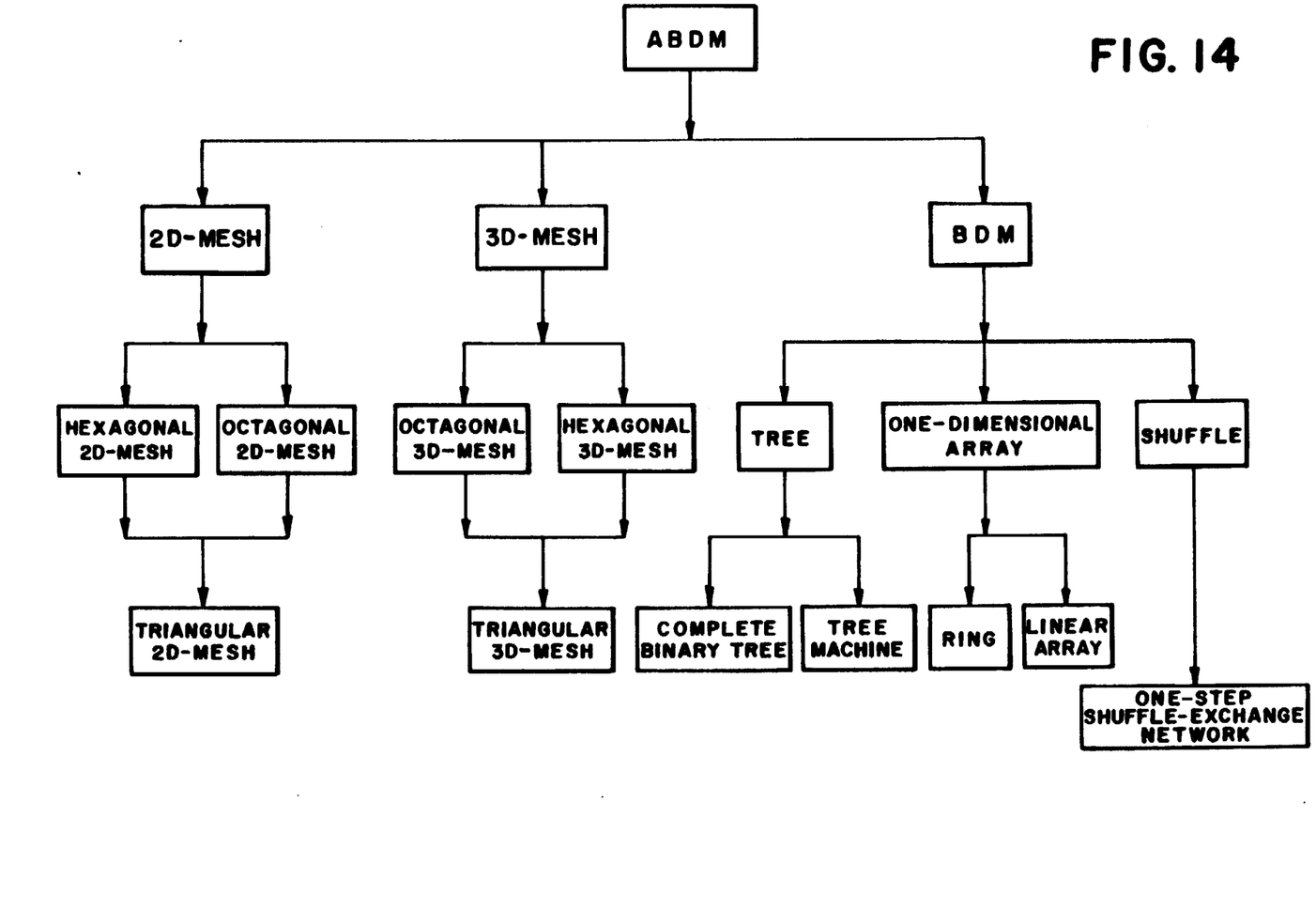
FIG. 14 is a pictorial representation of the different communications topologies contained within the multiprocessor network illustrated in FIG. 8.

FIG. 14 illustrates the network structures and problems which can be solved with the ABDM network. The augmented network contains, by definition, subset topologies, such as a binary De Bruijn multiprocessor network (BDM). It has been previously proven (see Samatham, above) that the De Bruijn network contains a tree structure capable of implementing either a complete binary tree or a tree machine. Additionally, included is a one dimension array structure which can be used to implement either a ring configuration or a linear array. A further topology subset of the BDM is the shuffle architecture which includes a one-step shuffle exchange network.

When the De Bruijn network is augmented as described above to include a 2D-mesh structure, the augmentation can provide for a hexagonal 2D-mesh and/or an octagonal 2D-mesh. If both of these structures are implemented, then the machine further contains a triangular 2D-mesh as an included subset topology.

Similarly, when a 2D-mesh of the augmented De Bruijn network is augmented to include a 3D-mesh structure, the technique can provide for an octagonal 3D-mesh implementation and/or a hexagonal 3D-mesh implementation. If both of these structures are implemented, then the machine further contains a triangular 3D-mesh as an included subset topology.

While a preferred embodiment of the invention has been shown, it will be obvious to those skilled in the art that various modifications and changes may be made thereto without departing from the spirit and scope of the invention as hereinafter defined in the appended claims.

We claim:

1. A multiprocessor network having a plurality N of processors connected together by a plurality of communications links, each processor adapted for parallel computation of an executable program with the other processors, said network comprising:

N processors, each having P communications ports, said communications ports connecting said N processors in the network by said plurality of communications links, wherein each port is adapted for sending and receiving data and instructions;

each of said N processors having a distinct address and having some of said communications links configured as a binary De Bruijn graph DG(2, k) of diameter k and of degree 4, where $N=2^k$; and each of said N processors having some of the remaining communications links configured as a 2D-Mesh.

2. The multiprocessor network as set forth in claim 1, wherein:
   each of said N processors has some of the remaining communications links configured as a 3D-Mesh.

3. The multiprocessor network as set forth in claim 2, wherein:
   the total number of communications links is Y, wherein Y is larger than N, but less than 12N.

4. The multiprocessor network as set forth in claim 3, wherein:
   4N of said Y communications links are configured as a DG (2,k).

5. The multiprocessor network as set forth in claim 4, wherein:
   Y-4N of said Y communications links are configured as a 2D-Mesh.

6. The multiprocessor network as set forth in claim 4, wherein:
   Y-6N of said Y communications links are configured as a 3D-Mesh.

7. The multiprocessor network as set forth in claim 2, wherein:
   the number P of communications ports is constant for all values of N.

8. The multiprocessor network as set forth in claim 7, wherein:
   the number P of communications ports is not less than 8.

9. The multiprocessor network as set forth in claim 2, wherein:
   said number of processors N is not less than 16.

10. The multiprocessor network as set forth in claim 2, wherein:
    said multiprocessor network having a 3D-Mesh has a degree of 8.

11. The multiprocessor network as set forth in claim 2, wherein:
    the number of communications links connected to each processor is constant for all values of N.

12. The multiprocessor network as set forth in claim 1, wherein:
    said multiprocessor network having a 2D-Mesh has a degree of 6.

13. A method for forming a network from N processors each having a constant number of communication ports supporting communication links between the processors, said method comprising the steps of:

forming said N processors into an undirected binary De Bruijn Multiprocessor (BDM) network of degree 4 and diameter k, where $N=2^n2^k$;

determining a Hamiltonian path through said BDM network;

arranging said Hamiltonian path in a two-dimensional array of i rows and j columns where $i \times j = 2^k$;

augmenting said BDM network by adding communication links between processors which are in adjacent rows and columns if they do not exist from the Hamiltonian path;

augmenting said BDM network by adding communication links between processors in the first row and last row which are in the same column; and augmenting said BDM network by adding communication links between processors in the first column and last column which are in the same row.

14. The method for forming a network as defined in claim 13, which further comprises the steps of:

segmenting said two-dimensional array into l smaller arrays of size $p \times q$ where $p \times g \times l = 2^k$;

stacking said l smaller arrays sequentially to form a three-dimensional stack; and augmenting said BDM network by adding communication links between each processor to a corresponding processor in the array preceding it in said stack and the array following it in said stack.

15. The method for forming a network as defined in claim 13, wherein:

said forming step includes the step of modifying said BDM network to provide a communications link between the first and last nodes of the BDM network.

16. The method for forming a network as defined in claim 13, wherein:

said forming step includes the step of modifying said BDM network to provide a communications link between each of the first and last nodes of the BDM network and external input/output devices.

17. A method for augmenting a linear ring multiprocessor network of processor nodes, each having a constant number of communication ports and supporting communication links between the processor nodes, said method comprising the steps of:

arranging the linear ring network in a two-dimensional array of i rows and j columns;

augmenting the linear ring network by adding communication links between nodes which are in adjacent rows and columns if they do not exist from the linear ring network;

augmenting the linear ring network by adding communication links between nodes in the first row and last row which are in the same column; and augmenting the linear ring network by adding communication links between nodes in the first column and last column which are in the same row.

18. The method for augmenting a linear ring multiprocessor network as defined in claim 17, which further comprises the steps of:

segmenting said two-dimensional array into l smaller arrays of size $p \times q$;

stacking said l smaller arrays sequentially to form a three-dimensional stack; and augmenting said three-dimensional stack by adding communication links between each node to a corresponding node in the array preceding it in said stack and the array following it in said stack.

19. A multiprocessor network having a plurality N of processors connected together by a plurality of communications links, each processor adapted for parallel computation of an executable program with the other processors, said network comprising:

N processors, each having a distinct address and having P communications ports, said communications ports connecting said N processors in the network by said plurality of communications links, wherein each port is adapted for sending and receiving data and instructions;

each of said N processors configured as a linear ring multiprocessor network having a degree 2; and each of said N processors having at least some communications links configured as a 2D-Mesh.

20. The multiprocessor network as set forth in claim 19, wherein:

each of said N processors having at least some communications links configured as a 3D-Mesh.

21. The multiprocessor network as set forth in claim 20, wherein:

said multiprocessor network having a 3D-Mesh has a degree of 6.

22. The multiprocessor network as set forth in claim 19, wherein:

said multiprocessor network having a 2D-Mesh has a degree of 4.

* * * * *